US008846123B2

(12) United States Patent
Zeeck

(10) Patent No.: US 8,846,123 B2
(45) Date of Patent: Sep. 30, 2014

(54) BIOMASS PELLETIZING PROCESS

(75) Inventor: James Russell Zeeck, Gretna, NE (US)

(73) Assignee: Pellet Technology LLC, Gretna, NE (US)

( * ) Notice: Subject to any disclaimer, the term of this patent is extended or adjusted under 35 U.S.C. 154(b) by 627 days.

(21) Appl. No.: 12/538,351

(22) Filed: Aug. 10, 2009

(65) Prior Publication Data

US 2010/0281767 A1 Nov. 11, 2010

Related U.S. Application Data

(60) Provisional application No. 61/176,541, filed on May 8, 2009.

(51) Int. Cl.
*C10H 1/04* (2006.01)
*F23K 1/00* (2006.01)
*C10L 5/44* (2006.01)
*F23K 1/02* (2006.01)
*F23K 3/00* (2006.01)

(52) U.S. Cl.
CPC ... *F23K 1/00* (2013.01); *C10L 5/44* (2013.01); *F23K 1/02* (2013.01); *F23K 3/00* (2013.01); *F23K 2201/10* (2013.01); *F23K 2201/20* (2013.01); *F23K 2201/30* (2013.01); *F23K 2201/50* (2013.01); *F23K 2201/505* (2013.01); *F23K 2203/103* (2013.01); *F23K 2203/201* (2013.01); *Y02E 50/10* (2013.01); *Y02E 50/30* (2013.01)
USPC ............................................ 426/442; 44/589

(58) Field of Classification Search
CPC .............. F23K 3/00; F23K 1/00; F23K 1/02; F23K 2201/05; F23K 2201/20; F23K 2201/50; F23K 2201/30; F23K 2201/10; F23K 2203/103; F23K 2203/201; Y02E 50/10; Y02E 50/30; C10L 5/44
USPC .............................. 44/500, 589, 634; 426/442
See application file for complete search history.

(56) References Cited

U.S. PATENT DOCUMENTS

| | | | |
|---|---|---|---|
| 4,082,859 A | 4/1978 | Katzen | |
| 4,515,816 A | 5/1985 | Anthony | |
| 4,613,339 A * | 9/1986 | Gunnerman et al. | 422/40 |
| 6,506,223 B2 | 1/2003 | White | |
| 6,711,881 B1 * | 3/2004 | McCracken et al. | 53/529 |
| 7,494,675 B2 | 2/2009 | Abbas et al. | |
| 7,998,511 B2 | 8/2011 | Abbas et al. | |
| 2003/0070779 A1 * | 4/2003 | Bransby | 162/97 |
| 2004/0231060 A1 | 11/2004 | Burdette et al. | |
| 2007/0283620 A1 * | 12/2007 | Karpik | 47/9 |
| 2008/0220125 A1 | 9/2008 | Abbas et al. | |
| 2008/0280236 A1 | 11/2008 | Wright | |
| 2009/0056205 A1 * | 3/2009 | Gauthier et al. | 44/530 |
| 2009/0064569 A1 | 3/2009 | Khater | |
| 2009/0205546 A1 * | 8/2009 | Kluko | 110/261 |
| 2010/0146850 A1 * | 6/2010 | Bexell | 44/589 |

* cited by examiner

*Primary Examiner* — James Goloboy
*Assistant Examiner* — Latosha Hines
(74) *Attorney, Agent, or Firm* — McKee, Voorhees & Sease

(57) ABSTRACT

A process is provided using non-food or limited-feed agricultural residue and energy crops for energy production, such as ethanol or electricity generation. The agricultural plant material is harvested and baled. The bales are transported to the processing site for storage or immediate processing. The bale strings are first removed, and then the broken bales are shredded. The shredded plant material is then ground to a small size. The ground material is then pelletized to produce densified pellets of the agricultural plant material. The pellets are cooled and then stored or transported to an end user.

27 Claims, 6 Drawing Sheets

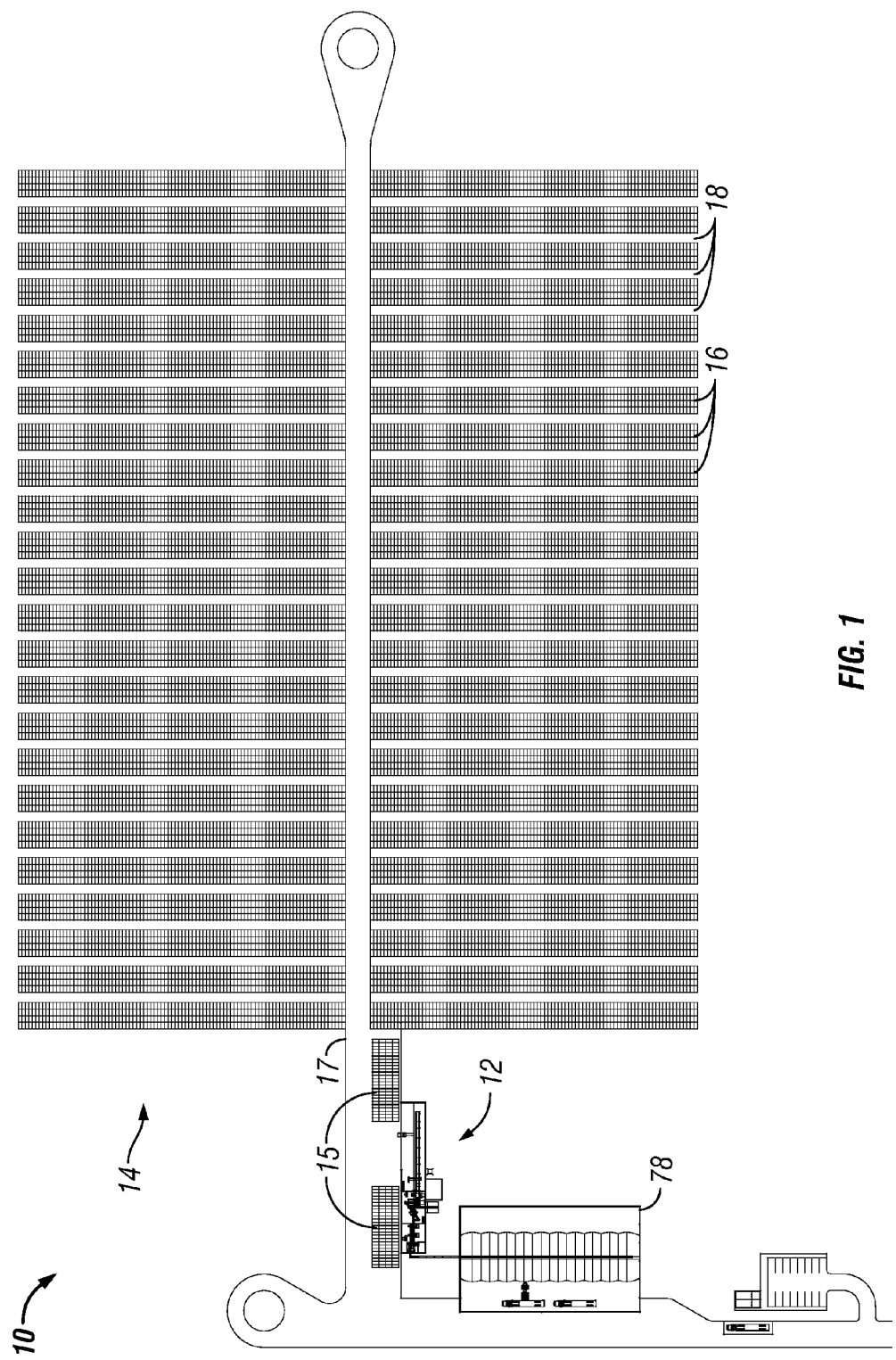

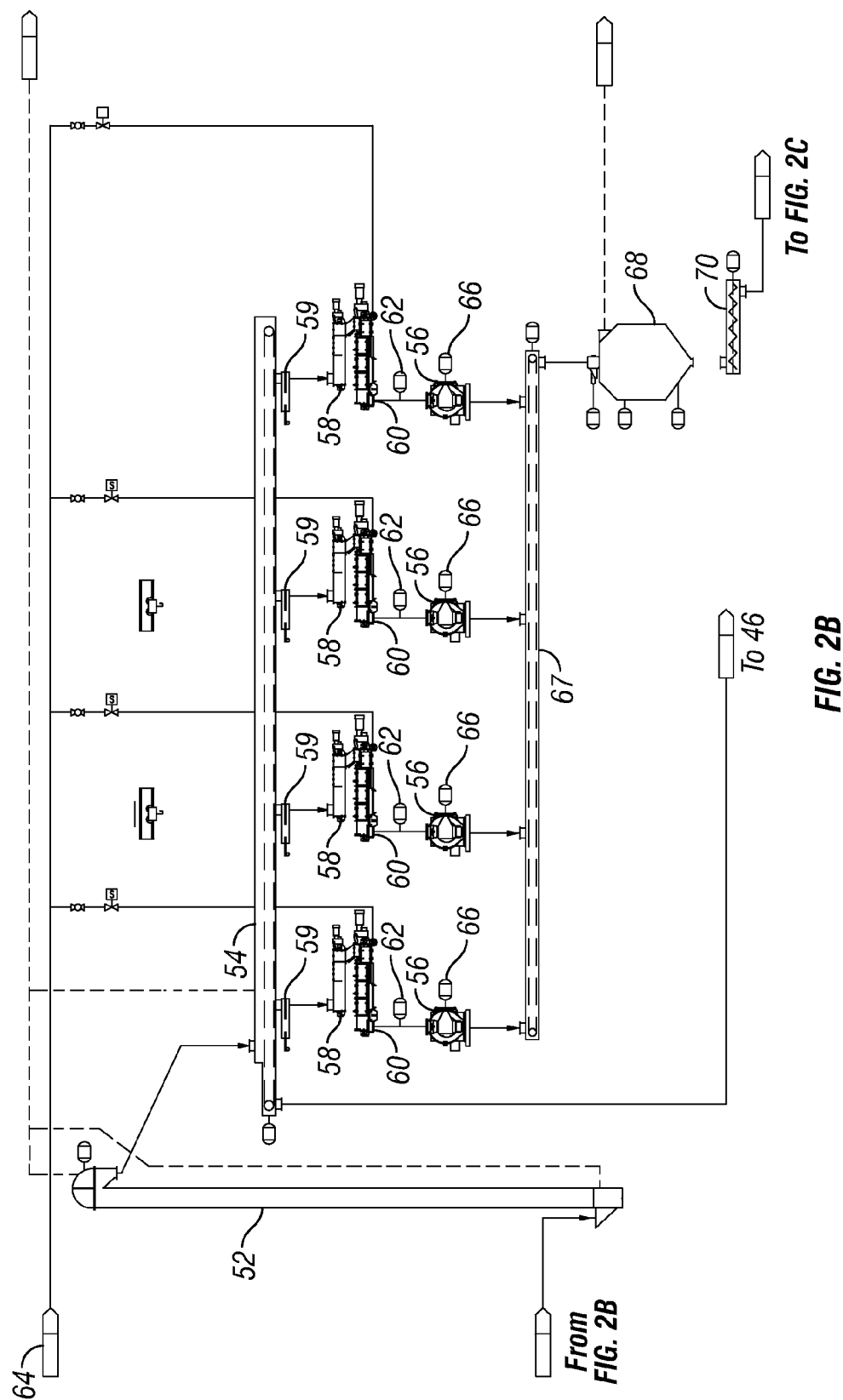

BIOMASS PELLETIZING PROCESS

CROSS-REFERENCE TO RELATED APPLICATIONS

This application claims priority under 35 U.S.C. §119 of a provisional application Ser. No. 61/176,541 filed May 8, 2009, which application is hereby incorporated by reference in its entirety.

FIELD OF THE INVENTION

The present invention is directed to a process for pelletizing biomass from agricultural-based resources including crop residue, energy crops such as switch grass, and other miscellaneous feed stocks without the use of natural or added binders.

BACKGROUND OF THE INVENTION

Biomass feed stock is useful in numerous industries such as the production of cellulosic ethanol, electricity production, heating fuels, and other commercial applications.

The 2005 Billion Ton study by the U.S. Department of Energy and U.S. Department of Agriculture concluded that agricultural and forest based biomass can displace 30% of the U.S. petroleum consumption by using approximately one billion dry tons of biomass feed stock per year.

The Energy Independence and Security Act of 2007 requires the United States to make one billion gallons of cellulosic ethanol from wheat straw, corn stover, rice straw, soybean stubble, milo stubble, forage sorghum, prairie hay, woodchips, cotton-gin residue, and a dozen other forms of agricultural waste. In the past, such waste materials have been generally considered to be of little or no value. In the past, meaningful volumes of cellulosic biomass agriculture material have not been brought to market on a commercial scale due to difficulties in integrating the supply chain to source, harvest, transport, storage, and processing of the material at a profit. Cellulosic ethanol producers and other renewable biomass users like electric utilities and industrial co-generation facilities require reliable, price-stable supplies of high quality biomass feed stocks. Successful and economic production of biofuels will facilitate independence from oil and petroleum-based fuels and reduce environmental concerns relating to production, transportation, storage, and use of such fuels; cellulosic biomass is the only real sustainable transportation liquid fuel. Thus, when correctly pursued, cellulosic ethanol can address many of the issues undermining national security and environmental well-being.

Biomass production from corn, soy, wheat, and other stover has not been practical or economical due to several barriers and risks. The use of crop stover in commercial scale production has been unsuccessful primarily due to (1) cost and logistics of stover (due to the low density of product) delivery for processing; (2) cost of protecting stored stover bales from weather and fire; (3) stover degradation; (4) stover pellet durability in withstanding standard handling and transportation; (5) inability to use current handling/storage infrastructure, resulting in high capital and operating costs; and (6) lack of a proven and reliable pellet processing of agriculture waste that works on a mass scale and does not use binding agents or other additives.

The stover agriculture residue and energy feed stock supply chain is an important component of large scale biofuel production and meaningful electric generation and has yet to be established, thereby slowing deployment of cellulosic, electrical generation, and other renewable energy technologies. The financial risks associated with feed stock ability to effectively be transported to market and processed on a continuous basis 365 days a year are a significant concern for investors and lenders.

Pelletizing of certain types of agricultural materials is an established practice. These agricultural materials are usually used as animal feed but more recently, some food crops such as hybrid corn, soybean oil, and sugar cane have been used for energy production Alfalfa is one example e of a feed crop that has been pelletized for years. Although is has only been used on a very small scale for fuel pellets, Alfalfa has come under fire in the food for fuel debate. These types of feed crops contain protein, sugar, and/or fat which serve as a natural binder in the pelletizing process.

Pelletizing non-food and non-primary feed crop residues have been problematic due to the lack of natural binders. For example, corn stover, soybean stubble, wheat straw, fruit tree trimmings, and walnut shells do not contain substantial protein to act as a natural binder. Thus, binder additives have to be used to facilitate pellet formation, which adds costs and creates emission concerns when burned such that use in electricity generation is undesirable or unfeasible due to environmental issues. Also, pellets made with binders are subject to decomposition and breakdown during normal handling, storage, and transport, which decreases the percentage of useful pellets. Also, crop residues have been used as a feed additive due to the fiber content, but is not a primary feed for livestock.

Furthermore, tapered dies used for pelletizing alfalfa and similar crops do not work for pelletizing stover, stubble, and stalks due to the stringy quality of these residues, which tend to plug the tapered dies. Also, shredded and ground alfalfa has a density of approximately 12 pcf, which conveys easily with pneumatic conveyors. However, shredded and ground crop residue is much lighter, for example +/−6 pcf, which is not conducive to pneumatic conveying and creates issues in pelletizing the stover material.

SUMMARY OF THE INVENTION

A primary objective of the present invention is the provision of an innovative systems-based approach to pelletizing agricultural residue and energy crops that generates pellets with sufficient density for effective transportation and handling using existing transportation infrastructure and storage practices. The pellet bioproduct of the present invention fills critical missing links in the biomass value and supply chain.

For example, with the present invention, the residue and crop processing will maintain cellulose and hemicelluloses levels for years. In the case of corn stover, the pellets produced are at least 95% stover and can be used as a feed stock for existing or new cellulosic ethanol processes or to supplement or replace coal for electrical generation or as a fuel for other biomass boilers with no additional processing. One aspect of the present invention is a single pass stover and crop harvesting which reduces equipment energy usage by 30%. The innovative facility design combines with the unique pelletizing process and product for large scale cellulosic ethanol, utility, and other biofuel markets. The pelletizing system of the present invention allows rapid, economical, and sustainable development of energy crops and crop residue as a feed stock so as to facilitate the biomass industry by utilizing existing grain industry transportation and storage infrastructure. Thus, biomass pellets can be developed as a commodity for producing cellulosic ethanol, as a substitute for coal in coal-fired electricity plants as well as a percentage to blend with coal, and for other commercial uses.

For illustrative purposes, the present invention produces several benefits when applied to the ethanol and electricity industries:

a. Estimated benefits compared to existing technology(ies) or system(s). Each ton of pellets converted to ethanol would displace at least one barrel of oil. For example, Applicant has estimated that by sustainably harvesting three tons of corn stover per acre from a third of the US corn acreage, the ethanol produced from this stover could displace over 100 million barrels of oil annually. Most of the energy consumed by processing stover would be used for grinding and pelleting; much of this energy would be offset by reduced transportation costs for the pelleted stover and reduced power consumption by the end user as well as a reduction of carbon in the environment. The pellets would require little or no modification for cellulosic ethanol production or use in coal-fired electricity generation facilities. Because of the fine grinding before pelleting, this product can be reduced to the desired particle size with minimal power consumption.

b. Cost to produce the targeted product(s), fuel(s), and/or power compared to best commercial technology. The current cost of pellet production is estimated at $40/ton in a Midwest production plant. Most estimates for wet biomass feed stocks are in the range of $30-50/ton; $40/ton for 90% dry pellets will be extremely competitive. Estimates of energy use in the pellet facility are 57 KWH/ton of pellets produced. The structure of the pellet will reduce the energy required to grind the stover in cellulosic ethanol and blended in coal-fired electricity generation facilities that require small feed stock particle size.

c. Compatibility of technology or product with existing infrastructure and end use applications. Another objective is to commercialize a stover pelleting process that utilizes existing infrastructure and end use applications. Material handling and transportation of the Applicant's stover and biomass pellets can be accomplished with existing infrastructure and transportation systems.

d. Projected energy and/or economic benefits. As another example, Applicant estimates that a 100,000 TPY pellet supply could support production of ~10 million gallons of cellulosic ethanol, the equivalent energy content of ~16 million therms. This is comparable to displacing ~$10,000,000 in natural gas (at $6/MMBtu), enough to generate 16 MW of bioenergy (~$14,000,000 at 30% efficiency, 10¢/kwh). This is enough energy to displace nearly 75,000 TPY of coal.

e. Public safety, environmental impacts and benefits, and land sustainability issues. The present invention will have a positive impact on soil quality and water use as well as reduction of hazardous/toxic substances, air emissions, and wastewater discharges. The process reduces the environmental impact of energy production while enhancing the economic viability of farms and quality of life for rural residents and energy consumers. Agricultural waste biomass is critical to healthy soil. The nutrient loop when used in cellulose plants can be maintained by returning nutrient-rich ash from processed cellulosic biofuels back to agricultural fields. For the cellulosic ethanol industry to succeed, there must be a reliable, price-stable supply of high quality feed stocks. Other processed biomass users such as utilities require comparable feed stock characteristics.

BRIEF DESCRIPTION OF THE DRAWINGS

FIG. 1 is a schematic site plan for the bale storage, pelletizing process, and pellet storage according to the present invention.

FIGS. 2A-2C are a series of drawings showing a process flow diagram of the present invention. FIG. 2A shows the grinding station; FIG. 2B shows the pelletizing station; and FIG. 2C shows the pellet storage station.

DESCRIPTION OF THE INVENTION

Figure 2A:
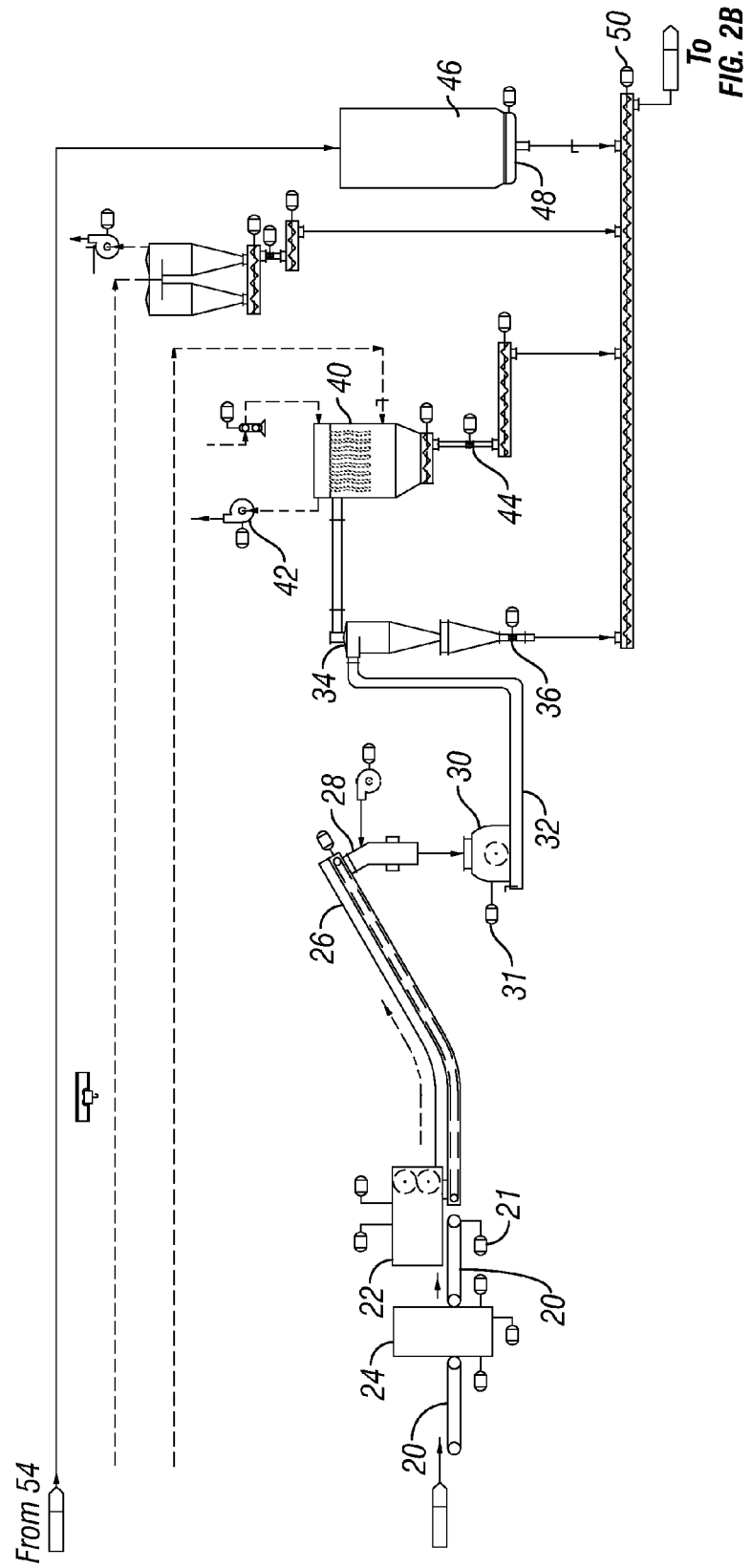

The overall objective of the present invention is to efficiently harvest, unload, store, handle, grind, densify, and loadout biomass feed stock. The following description focuses on agricultural residue and energy crops, but it is understood that similar processing pelletizing can be used for other biomass resources.

The raw material is received as truckloads of baled product and converted into a final pelletized product that can be handled and transported using standard grain handling equipment. This will allow the transportation of pelletized feed stock at maximum allowable loads using standard grain truck and rail transport equipment. Because the handling and transportation costs for the pelletized product is reduced, two or more of these stover collection and processing facilities can be linked into a delivery system for end users having need for increased volumes of pelletized biomass feed stock.

The overall design and equipment selection has a beneficial impact on both the capital and operating cost of the project. The process was developed based on existing equipment that has been used in biomass processing or other related fields. There are multiple manufactures for all the equipment used in this design.

The major processing equipment is connected using the established material handling systems. The layout is designed to provide an efficient and continuous process with ample room for efficient maintenance.

The materials handled in this process have a bulk density range of 1.5 to 38 pounds per cubic foot. The bulk material sizes range from raw material bales to finished pellets. The design incorporates the best available material handling equipment for the products handled. This process is designed around using equipment specifically designed to efficiently convey the specified products throughout the process. The overall design incorporates material handling systems and controls to provide a seamless and continuous process.

The material flow process is substantially automated and is controlled by the process control system. A PC based HMI (Human Machine Interface) allows an operator to monitor and adjust processing conditions for this entire process, after the raw material is delivered to the first conveyor of the system.

The process will produce a densified product in the form of pellets that can be handled and transported using the infrastructure already in place in North America and Europe. The pellets can be used as a supplement or to replace fossil fuels in existing coal-fired electricity generation facilities with no preparation. The pellets can also be used as a feed stock for existing or new processes using cellulose with minimal preparation.

Key benefits of the pellet production process for users such as electric utilities and cellulosic ethanol producers include: 1) the operating cost for the process; 2) the production of a durable product with final bulk density of 35 to 40 pounds per cubic foot that can be handled with standard grain handling equipment; 3) the production of a product that fits within the infrastructure already in place for grain handling and transportation; 4) the production of a product that can be used as a fuel source and/or feed stock for cellulosic ethanol production and for electricity production with minimal requirement for further processing and can be delivered to the customer on a turn key basis; and 5) produce a product with specific customer specifications that optimizes burner combustion in electrical generation plants and maximizes pre-treatment effectiveness for cellulose plants, without the customer adding infrastructure to their process. For example, based on review of all the cost factors for Midwest corn stover, a facility in the range of ~175,000 TPY will optimize the combination of factors used to set the process size. Increasing the capacity would increase the trucking time for transporting the bales from the farm to the collection and processing facility. This capacity also fits the design criteria for a single train-processing unit. Larger capacity would require the duplication of some of the major equipment, and extra personnel for handling and supplying bales to the process. Larger capacity would also require an increase in the bale storage area and the time required for bale retrieval.

The process starts with the shredding and baling of the agricultural residue or crop. The bales may be any desired size, using commercially available baling and handling machinery. For example, producing 3'×4'×8' corn stover bales with a bulk density of 10 pounds per cubic foot or greater, will result in a bale that will weigh at least 960 pounds. Thirty six bales (17 tons) can be transported from the field location to the processing plant on a standard 8'×48' flat bed tractor-trailer unit. The bale handling equipment is designed for one or more bales to be picked up, loaded, unloaded, and stacked using the same piece of equipment. This allows the purchase and use of multiple bale handling units at the field sites and the processing facilities. These bale handling units can be maintained at a central facility reducing the overall maintenance cost.

Layout and preparation of the bale storage area is critical for preserving the quality of the baled product and the accessibility for stacking and retrieval. The bale storage area is laid out for multiple stacks of bales with a buffer area between stacks. Fire prevention is essential for the stored bales. The following fire prevention precautions are incorporated in the design:
1. Restrict inbound bale moisture to not less than 14%.
2. Maintain at least a clean buffer area around the outside of the bale storage area.
3. Maintain a buffer between bale stacks.
4. The stack covers will be flame retardant to protect the stacks from sparks.
5. Lighting protection installed on the light poles and support structures.
6. Spark arresting mufflers will be added to all of the mobile equipment used in the plant.
7. A well defined clean-up program will be enforced for both the storage and processing areas.

When grinding through a ¼ inch grinder screen, then vibration screening for custom particle sizing and feed into a customer feed auger pelleting using ¼ inch dies, (for example), the final product will have a bulk density range of 35 to 40 pounds per cubic foot and a particle size of ¼" round by ½" to ¾" long. This pelletized product can be handled, stored, and transported using existing grain handling and transportation systems. The final product has less than 1% fines, a Pellet Durability Index of 98, and approximately 8-14% moisture, with a target moisture content of 10%.

The grinding and pelletizing process is designed as an integrated, computer controlled, continuous process. Variable speed drives on the feeders for the grinding and pelleting equipment are controlled by the amperage draw on the main motors. This eliminates power overloads but still keeps the equipment operating at optimal capacity. A surge tank installed between the grinding and pelleting operations dampens out the short-term variations of each operation and keeps the entire process operating at capacity, and allows the full use of the custom feed auger to the pellet machine.

Process Overview:

For purposes of the following description, the process will be described using corn stover, though it is understood that other crop waste (such as soybean, wheat, barley or sorghum stover) and energy crops (such as switch grass) can be used in the process along with other biomass feed stocks.

Figure 2C:
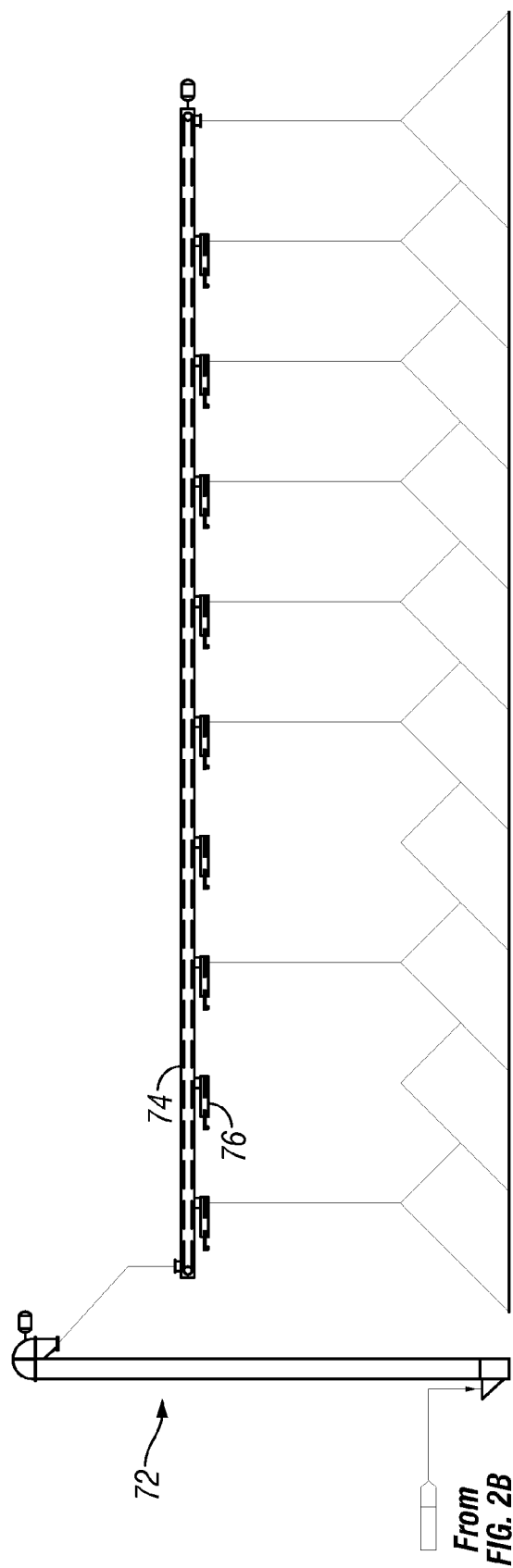
Figure 3:
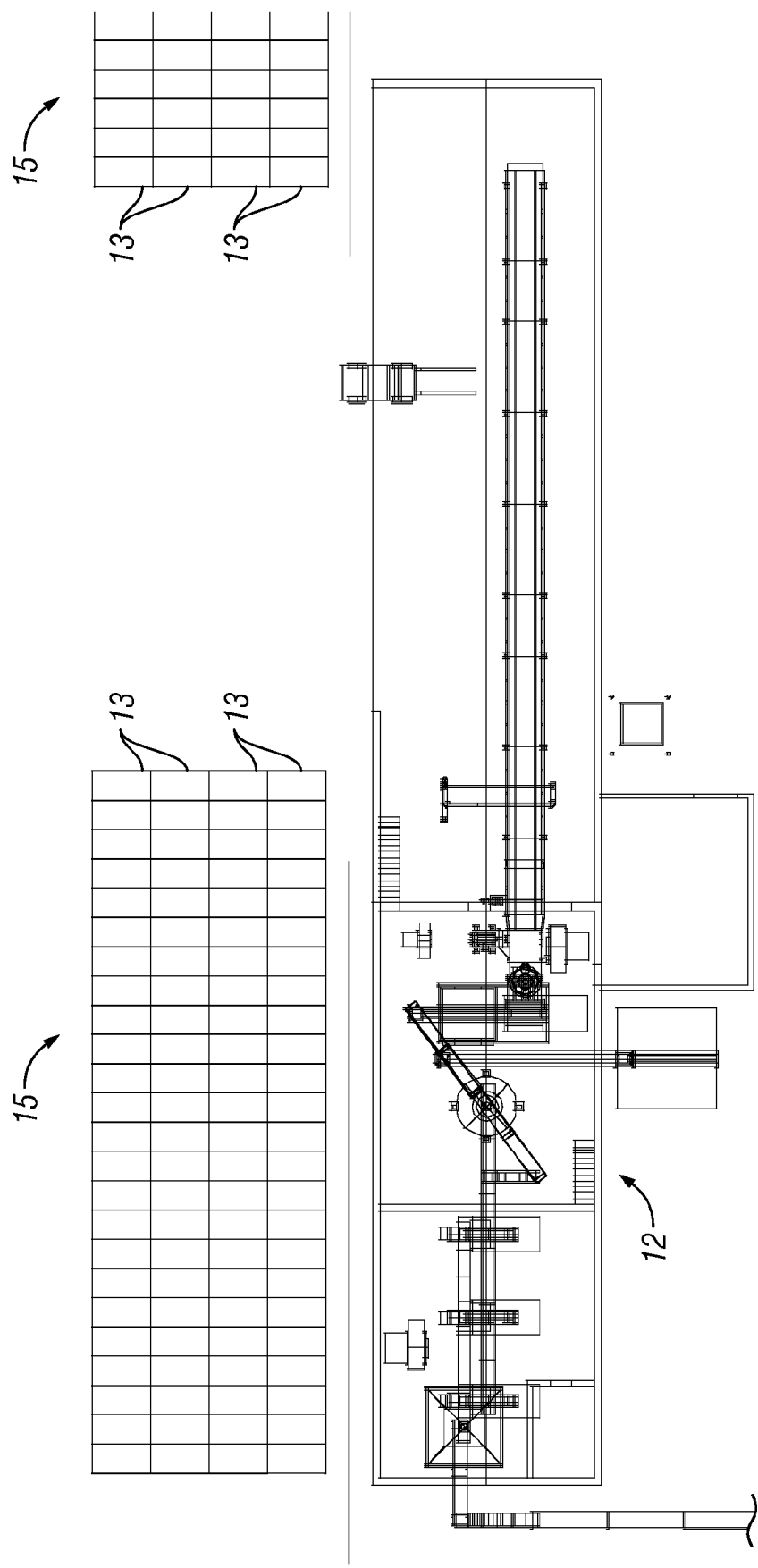
FIG. 3 is a plan view of the pelletizing station.
Figure 4:
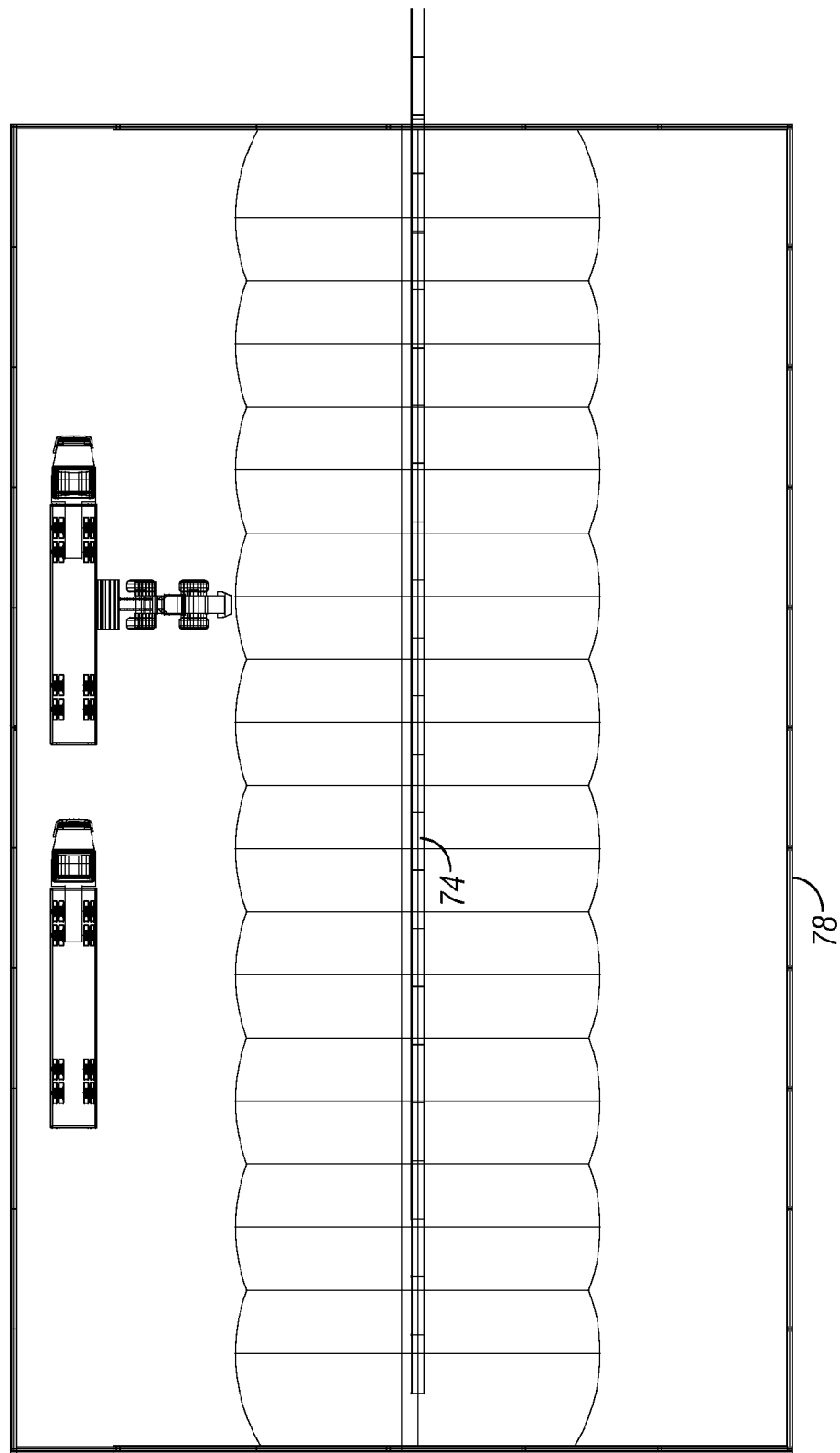
FIG. 4 is a plan view of the pellet storage station.

The following description applies generally to the process shown in FIGS. 2A-C, which is one example of the present invention. The process can be scaled up or down, as desired, and modified depending on the feed stock, without departing from the scope of the invention.

A. Harvesting and Baling

Harvest of corn stover begins with a shredding procedure, which cuts the stover and shreds it, while laying it into a windrow that can be easily baled. The harvest crews will remove approximately ⅗ of the above-ground stover, (the remaining ⅖ of the stover provides adequate soil coverage for moisture and erosion protection), using a square baler to bale the stover windrows. Attached to the rear of the baler, there will be a big bale accumulator, which groups three bales into a package, significantly reducing the time it takes to handle bales. This process also allows the baler to proceed at a faster pace by not having to stop for each bale to be unloaded. The commercially available Krone 1290 HDP baler averages 25 tons/hour for 3'×4'×8' bales. Once the bales have been deposited throughout the field by the accumulator, a Roadrunner Hay Squeeze operator will pick up six bales at a time to quickly and efficiently load bales onto the trailers in the fields.

At each collection and processing facility 10, one telehandler will be utilized for the unloading and stacking of bales 15. The facilities will also have a front-end loader for other bale loading and unloading duties.

The harvest details described above are a two-pass harvest system because it includes two passes in the fields, one with a tractor/shredder and another pass with a tractor/baler combination. The ultimate goal is a one-pass harvest combination system, using a modified header and corn reel attached to the front of a combine and a chopper and blower attached on the back. The header and reel feeds leaves and stalks into the combine so the biomass can be harvested before it touches the ground. The chopper cuts cobs, stalks, and leaves into approximately 2" pieces, thereby replacing and eliminating the shredding procedure pass. The blower throws the chopped stover into a wagon that is pulled behind the combine. This has the potential to reduce the rolling stock, labor, and diesel fuel usage by approximately 30%.

B. Receiving and Storage

Stover bales 13 will be received on flat bed trucks, removed with telehandlers, and stacked in the storage area 14, or staged in a staging area 15 adjacent to the process area 12.

The receiving and storage process is designed for receiving thirty-six 3'×4'×8' bales on an 8'×48' flat bed truck. Telehandler front-end loaders equipped with bale handlers are used to remove two bales at a time from the truck and place them into either a bale staging stacks 15 adjacent to the processing area 12 or in storage stacks 16 in the storage area 14 for longer-term storage, with the appropriate buffer rows 18 or borders.

A driveway 17 is provided between the opposite rows of stacks, as seen in FIG. 1. The staging and storage areas 14, 16 are built with appropriate drainage. The bales in the storage area 16 are covered with a water resistant and fire retardant tarp or cover. The bales in the staging area 14 may also be covered in the event operations are shut down.

C. Shredding

Bales are removed from the bale stacks 14, 16 and placed on the bale feed conveyor 20 using a telehandler equipped with a hydraulically controlled bale handler. The bale feed conveyor 20 is equipped with a variable frequency drive (VFD) 21 that controls the rate of bale movement into the bale shredder 22 and controls the subsequent shredding and grinding processing rates. The bale feed conveyor 20 provides the staging of bales ahead of the shredding process. This allows one operator with a telehandler to remove bales from the bale staging stacks and place on the conveyor 20.

As the bales are conveyed toward the bale shredder 22, they pass through a de-stringer 24 where the twine ties are automatically cut on the bottom of the bale and the loose twine is hooked from the top and removed from the bale.

The shredding process will be done indoors. The broken bales proceed into the shredder 22, pushed by the unbroken bales behind them on the staging conveyor 20. The shredder 22 preferably includes two shredding hammer mills, placed one above the other. These mills shred the baled stover through screens. This shreds the stover into pieces ranging from one to four inches in length with a bulk density of approximately 1.5 lbs. per cubic foot. The shredded stover drops out of the bottom of the shredding chamber into the stover transfer conveyor 26. This inclined drag conveyor collects and conveys this light stringy material from the shredder 22 to the pneumatic separator 28.

D. Grinding

Air is pulled from the shredder 22 for dust control and grinding assist. This air stream is drawn from the shredder chamber to the inlet of the pneumatic separator 28 classifier through a 48-inch half round cover on the transfer conveyor 26. This provides a means to move this air along with any entrained material to the subsequent pneumatic separator 28 and grinder/hammer mill 30 operations.

The pneumatic separator 28 is designed to remove rocks and other heavier materials from the lighter shredded stover stream. The pneumatic separator 28 is equipped with magnets to remove any ferric tramp metal from the shredded stover ahead of the hammer mill 30. The shredded stover flows from the separator 28, with some air assist, into the grinding hammer mill 30.

The material is ground in an air swept hammer mill 30 equipped with screens and hardened hammers. The mill is designed to use airflow to aid in the feeding of the light shredded material into the grinding chamber and assist in moving the ground material through the hammer mill screens. The airflow into the grinder 30 is made up of airflow from the bale shredder 22 and additional air introduced into the pneumatic aspirator 28. The hammer mill grinds the stover to a fine ground material. The ground material then crosses over a vibrating screen for a further screening process that allows the proper size particle to flow forward to the pelletizing process and returns the poor quality or oversized particles back to the grinder for further grinding and screening, thereby resulting in a particle size suitable to produce a durable pellet. The resulting ground and screened particles have a bulk density of approximately 6 lbs. per CF.

The grinder 30 is equipped with a bottom disengagement chamber designed for air conveying of the ground material from the hammer mill. An air conveying system 32 removes the ground material from the disengagement chamber and conveys it into a cyclone separator 34. The conveying air is made up of the airflow through the grinder 30 along with airflow added as makeup air into the grinder disengagement chamber. The cyclone separator 34 separates the ground material from the air stream. The ground material discharges the bottom of the cyclone separator through an airlock 36 into the ground stover collection conveyor 38.

The separated air stream is discharged into the dust collector baghouse filter 40. The dust collector subsequently removes any dust carried over from the cyclone separator 34 in the separated air stream along with additional air from the dust collection system. A baghouse fan 42 provides the motive air to drive the entire system. The baghouse discharges the collected material out the bottom of the bag house hopper through a rotary airlock 44 and ultimately into the ground stover collection conveyor 38.

A ground stover surge bin 46 holds ground stover for a limited-time surge capacity between the grinding and pelleting processes. This surge capacity allows the grinding and pelleting processes to be controlled somewhat independently. The pelleting operation can operate at optimum capacity, while the shredding and grinding processes operate at a rate to keep the surge tank 46 at approximately 75% of capacity. Level sensors on the surge tank 46 allow the operator to monitor tank level and make processing adjustments required to optimize the entire process.

The variable frequency drive motor 21 on the bale feed conveyor 20 into the shredder 22 controls the flow of material through the shredding and grinding operations and ultimately controls the level in the surge bin 46. The surge bin is equipped with a bin discharger 48 to assure a steady flow of material from the surge bin 46. The surge bin level will be monitored to control the flow of material through the shredding and grinding operations. High amp readings on the shredder motor 22 and grinder motors 31 will slow down or stop the material flow to prevent motor overloads.

E. Pelleting and Cooling

A variable frequency drive motor 50 on the ground stover collection conveyor 52 controls the flow of product to the ground stover bucket elevator 52 and ultimately the pellet mill supply drag conveyor 54. Ground stover flow from the grinder 30 is augmented by a flow of material from the surge bin 46. This is fed into the collection conveyor 38 through the bin discharger 48 to maintain the capacity of the collection conveyor 38 at that point to 100%. The system is designed to over-feed the pelleting capacity by 10% to 15% by adjusting the flow using the VFD 50 on the ground stover collection conveyor 38. This assures that the individual pellet mills each have the optimum supply of ground stover.

The ground stover feed system delivers the ground stover to pellet mills 56, using the specifically designed dual conveyor 54. This conveyor is a split drag conveyor with a solid center plate. The top section of this conveyor 54 carries up to 125% of the design capacity past the last pellet mill. At the end of the conveyor 54 the upper stream of ground material drops to the bottom of the conveyor and is conveyed back for deposit under a constant low pressure (approximately 3-6 psi) into the pellet mill feeders or conditioners 58 via slide gates 59. The feeders 58 meter the proper amount of feed into each mill 56 under consistent low pressure. Material in the lower stream of drag conveyor 54 that is not metered into the mill feeders 58 is conveyed back to the ground feed surge bin 46. This assures that there is always an adequate supply of feed to maximize the pellet mill capacity, as long there is a level in the surge bin 46.

Each pellet mill 56 is equipped with a metering screw 60, driven by a VFD 62 that meters the proper amount of ground stover into the pellet mill conditioner. A prescribed amount of water from a water supply 64 is added and blended with the ground stover in the conditioner as determined by the operator according to operating specifications. The amount of water added depends on the incoming stover moisture content. The wetted stover, at approximately 18% moisture, is force-fed into the pelleting chamber where two stationary rolls extrude the product through the small holes in the rotating die. The extrusion pressure and the friction of the material passing through the holes in the die provide the heat and pressure required to densify the product and produce a hardened pellet.

The VFD 62 on the pellet mill feeder 60 is controlled by the amperage draw set point on the pellet mill motor 66. This assures that each pellet mill 56 is operating at rated capacity and assures that the mills not only maintain maximum capacity but also sustain the maximum design compaction of the pelleted product.

The hot pellets exiting the dies are cut, collected and conveyed by a conveyor 67 to the pellet cooler 68 where they are cooled using ambient air in the counter flow pellet cooler 68. The hot pellets from the pellet mill entering the cooler are 150° to 180° F. and 17% to 18% moisture. The counter flow cooler 68 provides approximately 8 to 10 minutes of retention time for counter flow ambient air stream of 23,000 CFM to cool the pellets to ambient temperature before they are metered out of the cooling chamber. The evaporative cooling of the air passing through the pellet bed also removes the excess moisture producing a final pelleted product at 10% to 12% moisture and bulk density of 35 to 40 lbs. per CF. The cooler 68 discharges the pellets onto a conveyor 70.

The pelletizing process is successful without added binders 1. At least two main factors contribute to a stable pellet product. First, the shredded and ground material is fed into the pelletizing dies under a compressed flow by the conveyor 54. Second, the dies are straight faced rather than tapered to avoid plugging. The adjustable particle sizing allows the finished pellets to be customized for use in multiple industries.

F. Storage and Loadout

The final densified pellets are conveyed from the cooled pellet conveyor 70 to a bucket elevator 72 and then to an indoor storage conveyor 74. Slide gates 76 control discharge of pellets from the conveyor 74 inside the flat or bunker storage building 76 to await loading into grain trucks or rail cars for delivery to the final use points. The product will be loaded into grain trucks using a front-end loader. Alternatively, the pellets will be loaded out using a front loader to push the pellets into a grated pit, wherein a conveyor/elevator system delivers the pellets to a truck/rail loadout spout.

Due to the compaction of the material in the pellets and the 10% moisture content, it is not expected that significant dust will be generated. Any dust particles generated will be confined on the enclosed storage building which will normally operate with closed doors.

G. Controls

One programmable logic controller (PLC) located in the plant electrical equipment room will be provided to control the plant operations. An operator workstation will be located in the process control room for monitoring and controlling the entire process. Three human machine interface panels (HMI's) are located in the processing areas to provide for a local startup and control of the large rotating equipment where onsite observation is required for safe startup of this equipment.

| Process Total | | |
|---|---|---|
| Total Connected HP | 2,238 | HP |
| Average Load | 1,643 | HP |
| Load Factor | 73.4% | of Full Load |
| Power Ratio | 77.44 | HP per Ton |
| Power Consumption | 1,643 | HP Hr per Hr |
| | 1,225 | KWH per Hour |
| | 57.75 | KWH per Ton |

The power for grinding is required to produce the fine ground product that is required to produce a dense and durable pellet. In addition the product produced in this process needs little or no modification by the final user. The pellets can be used as a renewable energy source in almost any coal or biomass boiler without further processing. Facilities using the product such as cellulosic ethanol plants or coal-fired boilers will find that because of the fine grinding before pelleting, this product can be reduced to the desired particle size with minimal power consumption.

The pelleting process results in a final product bulk density of 38 to 40 pounds per cubic foot which can then be handled and transported using standard grain handling and transportation equipment. This allows this product to fit into the infrastructure already in place for grain handling and transportation.

Control System Description:

Located in the plant control room will be an operator work station and an engineering work station, each having their own display screens and computers. Each station will have the ability to operate the entire plant independently from each other. Each workstation will have its own peripherals (mouse, keyboard, printer, uninterruptible power supply, etc.).

Two human machine interfaces (HMI's) with color touch screens will be placed in the plant to allow local operator monitor and control of the automated process. Field panels will be provided for starting of critical rotating equipment where onsite observation is required for starting this equipment Two totally redundant servers located in the plant control room will be provided for data collection, plant maintenance identification, and work orders. An Ethernet switch/router will provide a high-speed link between the workstations, switch/router, and the (HMI) and PLC controller.

One programmable logic controller (PLC) located in the plant electrical equipment room will be provided to control of the operations selected by the plant operators. Sufficient input and output cards will be provided to allow for monitoring and control of plant variables (start, stop, speed, level, pressure, temperature, etc.). The PLC and associated hardware will be placed in a controlled environment and provided with an uninterruptible power supply.

Communication between the computers, servers, and programmable logic controller (PLC) will be Ethernet. Communication between the PLC and motor control centers as well as selected field devices will be device net. Communication between the PLC and field devices that do not have the Device net protocol will either be a 4 to 20 milliamp signal or a 0 to 10 volt signal.

What is claimed is:

1. A process for utilizing agricultural crop residue material comprising:

harvesting from a field agricultural crop residue material selected from a group consisting of corn stover and soybean stubble; then bailing the harvested material; then transporting the baled material to a storage site; then shredding the baled material; then grinding the shredded material; then pelletizing the ground material into pellets without the use of binding additives and consisting essentially of the ground material;

transporting the pellets to a facility for use.

2. The process of claim 1 wherein the material is harvested and baled in a single pass through a field where the agricultural material is grown.

3. The process of claim 1 wherein the pelletized material has a density of 35-40 pounds per cubic foot.

4. The process of claim 1 further comprising restricting bale moisture to less than 15%.

5. The process of claim 1 further comprising storing the baled material in an outdoor storage area having a water draining base under the bales and a removable, water-resistant, fire-retardant cover over the bales.

6. The process of claim 5 further comprising providing lightning protection in the storage area.

7. The process of claim 1 wherein the pellets have less than 2% fines.

8. The process of claim 1 wherein the pellets have a durability index of at least 98.

9. The process of claim 1 wherein the pellets have a moisture content of approximately 10%.

10. The process of claim 1 wherein the harvesting step includes pre-shredding the material before baling.

11. The process of claim 1 wherein the grinding step includes a hammer mill screen and a vibrating system.

12. The process of claim 11 wherein material that does not pass through the vibrating screen is returned to the hammer mill screen for additional grinding.

13. The process of claim 1 further comprising wetting the ground material before pelletizing to control die temperature.

14. The process of claim 1 further comprising cutting the pellets prior to transportation.

15. The process of claim 1 further comprising pneumatically separating rocks and other heavy particles from the material.

16. The process of claim 1 further comprising cooling and drying the pellets using ambient air.

17. The process of claim 1 wherein the pellets are formed by extruding the ground material through a die.

18. The process of claim 1 wherein the material is ground to a density 6-8 pounds per cubic foot.

19. The process of claim 1 wherein excess ground material beyond the pelletizing capacity is reconveyed for use in the pelletizing step.

20. The process of claim 1 further comprising storing ground material in a surge bin for use in the pelletizing step.

21. The process of claim 1 wherein the ground material is fed into a straight, non-restricted die for pelletizing.

22. The process of claim 1 wherein the ground material is fed by a split conveyor under a compressed flow into a die for pelletizing.

23. The process of claim 22 wherein a conveyor feeds the ground material into a material conditioner wherein water is added before delivery to the die to control die temperature, and the conveyor returns excess material to a storage bin for future delivery to the die.

24. The process of claim 1 further comprising using the pellets for energy production.

25. A process for utilizing agricultural crop residue material for energy production comprising:

harvesting from a field agricultural crop residue material selected from a group consisting of corn stover and soybean stubble;

bailing the harvested material;

shredding the baled material;

grinding the shredded material;

pelletizing the ground material into pellets without the use of binding additives, the pellets being comprised of at least 95% of the ground material; and wherein the ground material is fed into a straight, non-restricted die for pelletizing.

26. A process for utilizing agricultural crop residue material for energy production comprising:

harvesting from a field agricultural crop residue material selected from a group consisting of corn stover and soybean stubble;

bailing the harvested material;

shredding the baled material;

grinding the shredded material;

pelletizing the ground material into pellets consisting essentially of the ground material; and wherein the ground material is fed under a compressed flow through a split conveyor into a die for pelletizing.

27. A process for utilizing agricultural crop residue material for energy production comprising:

harvesting from a field agricultural crop residue material selected from a group consisting of corn stover and soybean stubble;

bailing the harvested material;

shredding the baled material;

grinding the shredded material;

pelletizing the ground material into pellets consisting essentially of the ground material;

providing an air flow for assisting the flow of material through the grinding and pelletizing steps.

* * * * *